United States Patent
Schell

(10) Patent No.: US 12,449,392 B2
(45) Date of Patent: Oct. 21, 2025

(54) PH MEASURING CELL

(71) Applicant: Optek-Danulat GmbH, Essen (DE)

(72) Inventor: Ingo Schell, Essen (DE)

(73) Assignee: Optek-Danulat GmbH, Essen (DE)

( * ) Notice: Subject to any disclaimer, the term of this patent is extended or adjusted under 35 U.S.C. 154(b) by 335 days.

(21) Appl. No.: 18/025,421

(22) PCT Filed: Oct. 27, 2021

(86) PCT No.: PCT/EP2021/079841
§ 371 (c)(1),
(2) Date: Mar. 9, 2023

(87) PCT Pub. No.: WO2022/135774
PCT Pub. Date: Jun. 30, 2022

(65) Prior Publication Data
US 2024/0011933 A1 Jan. 11, 2024

(30) Foreign Application Priority Data
Dec. 22, 2020 (EP) .................................... 20216664

(51) Int. Cl.
*G01N 27/30* (2006.01)
*G01N 27/28* (2006.01)
*G01N 27/333* (2006.01)
*G01N 27/403* (2006.01)

(52) U.S. Cl.
CPC ......... *G01N 27/302* (2013.01); *G01N 27/283* (2013.01); *G01N 27/333* (2013.01); *G01N 27/4035* (2013.01)

(58) Field of Classification Search
CPC .. G01N 27/302; G01N 27/283; G01N 27/333; G01N 27/403; G01N 27/4035
See application file for complete search history.

(56) References Cited

U.S. PATENT DOCUMENTS

| | | | | |
|---|---|---|---|---|
| 3,880,737 | A * | 4/1975 | Brunt | G01N 27/401 204/435 |
| 3,959,107 | A * | 5/1976 | Horner | G01N 27/4035 204/415 |
| 4,012,308 | A * | 3/1977 | Jerrold-Jones | G01N 27/4035 204/408 |
| 7,880,471 | B2 | 2/2011 | Fanselow et al. | |
| 2009/0096458 | A1 | 4/2009 | Fanselow et al. | |
| 2011/0048942 | A1* | 3/2011 | Talutis | G01N 27/26 29/428 |

FOREIGN PATENT DOCUMENTS

| | | | |
|---|---|---|---|
| DE | 100 19 991 A1 | 1/2002 | |
| DE | 10 2004 058 863 A1 | 6/2006 | |
| DE | 102006048898 A1 * | 4/2008 | ............. G01N 27/26 |

OTHER PUBLICATIONS

EPO machine-generated translation of Schiffer et al. DE 102006048898 A1, patent published Apr. 30, 2008 (Year: 2008).*

(Continued)

*Primary Examiner* — Alexander S Noguerola
(74) *Attorney, Agent, or Firm* — Renner, Otto, Boisselle & Sklar, LLP

(57) ABSTRACT

The present invention relates to a pH measuring cell with an adapter and a system comprising a pH measuring cell and a combination electrode.

7 Claims, 3 Drawing Sheets

(56) References Cited

OTHER PUBLICATIONS

EPO machine-generated translation of Schiffer et al. DE 102004058863 A1, patent published Jun. 8, 2006 (Year: 2006).*
International Search Report from corresponding International Patent Application No. PCT/EP2021/079841 dated Jan. 18, 2022.
Written Opinion from corresponding International Patent Application No. PCT/EP2021/079841 dated Jan. 18, 2022.

* cited by examiner

PH MEASURING CELL

FIELD OF THE INVENTION

The present invention relates to a pH measuring cell and a system including the pH measuring cell.

BACKGROUND OF THE INVENTION

In the industry, combination electrodes with approximately 12 mm diameter and 120 mm immersion depth are preferably used for pH measurements, there being a plurality of different designs for different process conditions.

It is often desirable to keep the volume of the measurement chamber as small as possible, in order to "consume" as little fluid as possible for the measurements. In addition, a larger dead volume also leads to increased mixing/carryover of fluid, which passes through the measuring cell successively.

The installation of the combination electrode in the measuring cell usually proves to be difficult, since reliable sealing of the measurement chamber has to be ensured. Moreover, it is important to avoid damaging the combination electrode.

In the case of some measuring cell applications, it is necessary to clean the measuring cell frequently or cleaning is possible only with considerable effort.

In addition, sealing problems are encountered with the assembly and dismantling of the combination electrode with the measuring cell. Furthermore, an additional clamping device is required for the sealing in the prior art. Furthermore, the seals are not yet pressed in for example during transport in the prior art, because the clamping devices are only fitted at the application site, so that germs could penetrate into the measurement chamber.

SUMMARY OF THE INVENTION

The aim of the present invention is to eliminate the drawbacks of the prior art and in particular to specify a pH measuring cell which can be used flexibly and diversely, produced cost effectively and assembled in a straightforward manner. In addition, the assembly of the measuring cell on the combination electrode and the tightness are to be improved.

This aim is accomplished with the features of the coordinated claims. Advantageous developments of the invention are given in the sub-claims. All combinations of at least two features disclosed in the description, the claims and/or the figures also fall within the scope of the invention. In the case of stated value ranges, values lying within the stated limits should also be deemed to be disclosed as limiting values and can be claimed in any combination. To prevent repetition, features disclosed according to the system should also deemed to be disclosed and are claimed as being according to the device. Likewise, features disclosed according to the device should also deemed to be disclosed and are claimed as being according to the system.

The invention relates to a pH measuring cell with:
- a measurement chamber and at least one opening for a fluid,
- a pH measurement locating fixture for locating a rod-shaped locating section of a combination electrode for measuring the pH value of the fluid in the measurement chamber, wherein the pH measurement locating fixture has an insertion opening, through which the locating section can be inserted in an insertion direction,
- a compressing element for compressing a sealing ring of the combination electrode, which sealing ring can be arranged in the locating section, for sealing the measurement chamber against the environment, and
- an adapter for locating the combination electrode in a fastening region of the combination electrode, wherein the adapter is constituted in two parts with a first adapter part and a second adapter part.

The measuring cell can be constituted as a tank with a single opening; the measuring cell can alternatively be constituted as a flow-through measuring cell with an inlet opening and an outlet opening, wherein the measurement chamber is arranged between the inlet opening and the outlet opening.

According to the invention, it is advantageously possible by means of the two-part structure of the adapter to improve the sealing of the measurement chamber against the environment. Furthermore, an additional clamping device for compressing the sealing ring is advantageously not required.

According to the invention, it is particularly advantageously possible by means of the two-part structure of the adapter that the combination electrode can be assembled in a special highly pure area and the measurement chamber is separated tightly from the surrounding area after the clamping of the adapter/compressing of a seal of the measurement chamber, so that no germs can penetrate when it brought into and used in a less pure production site. After completion of a production run, the measuring cell can be removed with the combination electrode from the production device and fed for disposal without the risk of process fluid escaping.

Provision is preferably made such that the second adapter part is constituted for locating the combination electrode in the fastening region, in particular by a screw connection, and the second adapter part can be screwed into the first adapter part. It is thus advantageously possible that the compressing of the sealing ring can take place by the screwing-in of the second adapter part into the first adapter part.

Furthermore, provision is preferably made such that pressure can be exerted on the compressing element by the first adapter part by the screwing-in of the second adapter part, wherein the sealing ring can be compressed by the compressing element by the pressure of the first adapter part and the measurement chamber can be sealed with respect to the environment. It is thus advantageously possible for the pressure generated by the screwing-in of the second adapter part to be transmitted in the optimum manner onto the sealing ring by the compressing element.

Furthermore, provision is preferably made such that the compressing element is constituted annular and has a bevelled compressing surface, wherein the compressing surface abuts against the sealing ring. Due to the annular formation, the combination electrode constituted elongated can be pushed through the compressing element during the assembly, so that the compressing element can also serve as a lateral support of the combination electrode. In addition, it is also advantageously possible with the bevelled compressing surface that the sealing ring can be deformed in the optimum manner, in order to enable the sealing of the measurement chamber against the environment.

Furthermore, provision is preferably made such that the sealing ring is arranged between a supporting ring and the compressing element. Advantageously, it is thus possible for the sealing ring to be pressed onto the supporting ring, so that the compression can take place in the optimum manner. Moreover, the supporting ring is exchangeable, so that different designs of the combination electrode can be accommodated.

The idea underlying the invention is in particular to design the measuring cell in such a way that the combination electrode is guided through a relaxed sealing ring during the assembly and for sealing by compressing the sealing ring only to take place in the introduced position of the combination electrode.

On the one hand a sealing effect and on the other hand a clamping effect can be produced by the compression, so that the design of the measuring cell leads to a dual function of the seal; measuring cell.

It is particularly advantageous to constitute the measuring cell at least partially, preferably predominantly, of plastic and/or rubber. A cost-effective production of the measuring cell is thus possible. Moreover, the measuring cell can be constituted as a one-way measuring cell.

In other words, the operating position can be achieved by the application of a compressing force on the sealing ring in combination with the adapter in the insertion direction of the combination electrode exclusively from outside the measuring cell. Exclusively from outside means that no mechanical means for applying pressure are provided on the measuring cell itself. The measuring cell can thus have a geometry which can be produced extremely easily and cost-effectively.

According to the invention, it is also conceivable for the measurement chamber to be formed by a measuring cell body, on which the pH measurement locating fixture is formed. It is particularly advantageous to produce the measuring cell body from two halves, indeed in one piece, in particular from a uniform material.

The measuring cell can be produced as a one-way measuring cell, in particular produced predominantly, preferably at least 90%, still more at least preferably 95%, from chemical elements with an ordinal number less than 17. The measuring cell is thus gamma-permeable insofar as a complete and homogeneous exposure of the measurement chamber to gamma rays for disinfection is possible. In this way, the production for dispatch or transport of the measuring cells according to the invention is greatly simplified, since the measuring cells can be exposed to gamma rays and duly disinfected in the packaged state.

Contamination during the packaging of the measuring cells is thus excluded and the packaging can be carried out correspondingly cost-effectively.

By means of the supporting ring and the compressing element, the measuring cell can be adapted in the optimum way to different combination electrodes for installation in the measuring cell. The supporting ring and the compressing element can be fixed in the measuring cell body, in particular by gluing, in the respectively appropriate shape, in particular with a predefined internal diameter, during the production of the standard measuring cell body. Clamping of the sealing ring in the exactly prescribed insertion depth with a defined insertion length of the combination electrode is advantageously provided, wherein compressing of the sealing ring only takes place in the fully screwed-in position.

The adapter can advantageously be used not only for the compressing, but also for the adaptation of the measuring cell to different combination electrodes and thus forms a dual function. The adapter performs a further function, in that it protects the combination electrode against influences from outside, in particular against damage, for example due to external forces such as impacts or traction. Such forces can easily lead to breakage with unsupported combination electrodes.

In particular, the adapter can advantageously be used for a plurality of measurement cycles, since contact with the fluid flowing in the measurement chamber is not provided according to the invention. The adapter acts on the seal from outside, whilst the supporting ring is arranged on the opposite side of the sealing ring, i.e. facing the measurement chamber.

Insofar as the compressing takes place in part in the insertion direction S and in part in the direction of the circumference of the locating section, i.e. preferably by the sealing ring acting obliquely to insertion direction S, not only is ideal sealing of the measurement chamber against the environment achieved, but also fixing of the combination electrode in the measurement chamber, so that secure positioning/fixing of the combination electrode in the measurement chamber is provided even with higher fluid pressures.

The invention also relates to a system comprising a measuring cell according to the invention and a combination electrode. The preferred embodiments and the effects and advantages as described above for the measuring cell apply accordingly to this system.

BRIEF DESCRIPTION OF THE DRAWINGS

Further advantages, features and details of the invention emerge from the following description of preferred examples of embodiment and with the aid of the drawings. In the latter.

DETAILED DESCRIPTION OF THE INVENTION

In the figures, identical elements and elements with the same function are denoted by the same reference numbers.

Figure 1:
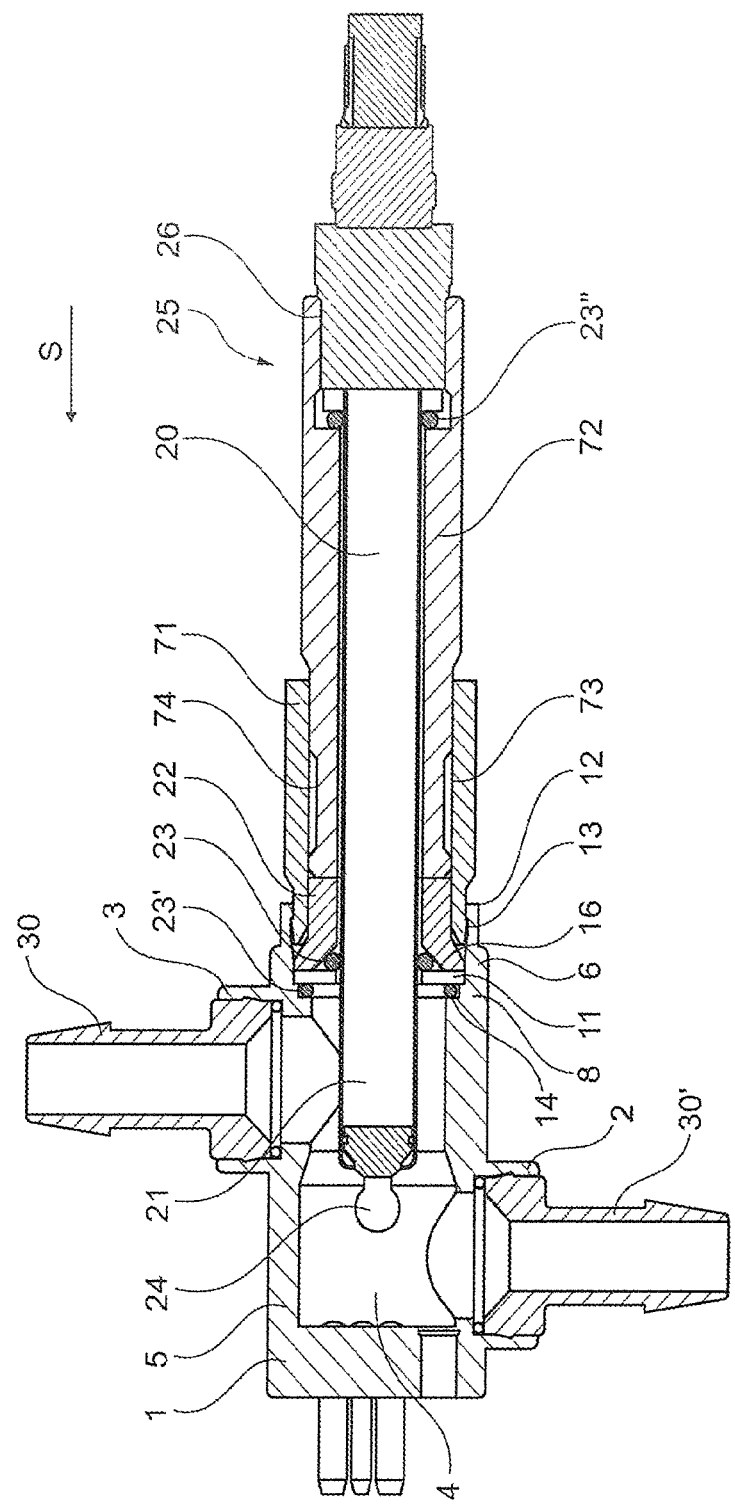
FIG. 1 shows diagrammatically a system according to the invention comprising a measuring cell according to the invention with a two-part adapter and an assembled combination electrode.

FIG. 1 shows an exemplary pH measuring cell 1 according to the invention, through which a fluid can flow. Alternatively, it is conceivable for the pH measuring cell to be constituted as a tank, wherein the tank has only a single opening. The text stated below applies analogously to the tank.

Measuring cell 1 comprises a measurement chamber 4 bounded by a measuring cell body 5 on which pH measurement locating fixture 8 is formed. The fluid flows through measurement chamber 4, the pH value of which is measured with a combination electrode 20 insertable into measurement chamber 4.

The measuring cell comprises an inlet opening 2 for the inflow of the fluid and an outlet opening 3 for the outflow of the fluid.

Figure 2:
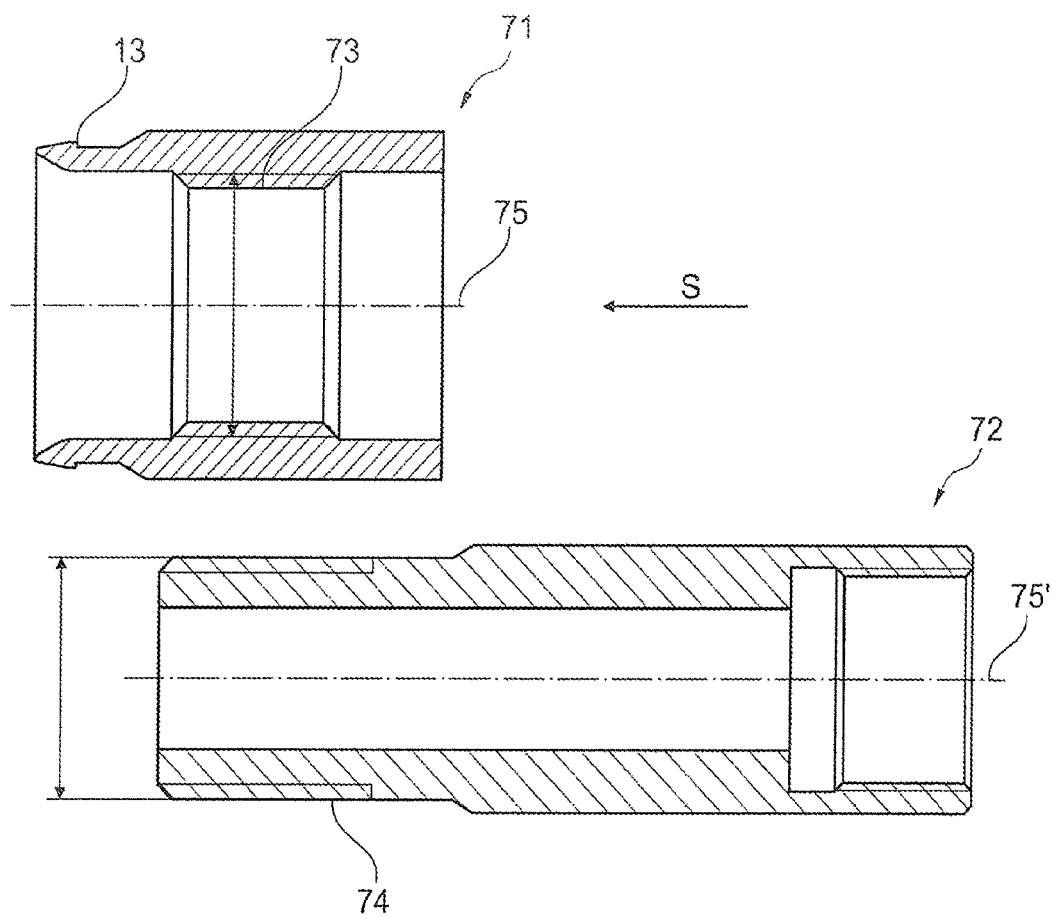
FIG. 2 shows a diagrammatic view of a first part and a second part of the two-part adapter.

FIG. 2 shows a diagrammatic view of a first part 71 and a second part 72 of a two-part adapter 71, 72 of a measuring cell 1 according to the invention. First part 71 comprises an internal thread 73 arranged in the middle and a snap-in nose 13 in the front region of the first part 71 as viewed in insertion direction S. First part 71 comprises a continuous opening along its longitudinal axis 75. First part 71 is constituted rotationally symmetrical with respect to longitudinal axis 75. In the assembled or snapped-in state, first part 71 can introduce axial forces into the measuring cell body, but is freely rotatable.

Second part 72 of the two-part adapter comprises an external thread 74 in the front region as viewed in insertion direction S. External thread 74 is constituted such that it is screwed into internal thread 73 of the first part during the assembly of the adapter. The front region of second part 72 is constituted tapered with respect to the rear region of second part 72. Second part 72 comprises a continuous opening along its longitudinal axis 75'. First part 71 is constituted rotationally symmetrical along its longitudinal axis 75'.

The surface of second part 72 directed towards compressing element 22 permits the transmission of compression forces for the pressing action, but is rotationally symmetrical with respect to insertion direction S and transmits only small torques to compressing element 22 and seal 23.

FIG. 1 also shows a system according to the invention comprising two-part adapter 71, 72, and measuring cell 4. Arranged at a measuring cell 4 are two connection adapters 30, 30', to which hoses or lines (not represented) for the fluid can be connected.

In its position inserted in insertion direction S represented in FIG. 1, a combination electrode 20 projects into measurement chamber 4 less than a third of the length between the tip and the fastening thread of the combination electrode, in the specific example of embodiment up to inlet opening 2, through which the fluid enters into measurement chamber 4. By this means, a minimisation of the fluid volume in measurement chamber 4 with at the same time a maximisation of the measurement distance along the pH electrode is achieved.

The section of combination electrode 20 projecting into measuring cell 1 is referred to as locating section 21 and has a rod-shaped form, whilst combination electrode 20 otherwise chiefly has a circular cylindrical shape. At its front end viewed in insertion direction S, combination electrode 20 comprises a tapering section and a spherical measurement tip 24.

Combination electrode 20 or rod-shaped locating section 21 can be inserted in insertion direction S through insertion opening 6 of pH measurement locating fixture 8 into measurement chamber 4. A sealing ring 23 sits on combination electrode 20 or rod-shaped locating section 21, which sealing ring sits loosely during the assembly and can thus easily be moved along combination electrode 20. A sealing effect, in particular with fluid pressure present, is not yet experienced by sealing ring 23 at this point. The insertion of combination electrode 20, but also the pushing-on of sealing ring 23 onto combination electrode 20, is thus greatly simplified, so that damage to the sensitive combination electrode 20 is prevented.

When being inserted, but at least in the inserted position, sealing ring 23 abuts against a supporting disc 11, which is inserted into and preferably fixed in the position shown in FIG. 5 before the insertion, in particular during the production of measuring cell 5. Locating section 21 is inserted through supporting disc 11, until two-part adapter 71, 72 surrounding combination electrode 20 snaps onto a shoulder 12 pointing towards combination electrode 20. For this purpose, snap-on noses 13 are provided on first adapter part 71. Alternatively, the adapter is already snapped on before combination electrode 20 is assembled.

Located between supporting disc 11 and a stop 14 of measuring cell 4 is a further sealing ring 23', which is spaced apart from sealing ring 23, in particular is separated by supporting disc 11.

In the example of embodiment shown, supporting disc 11 forms a stop and shoulder 13 forms a counter-stop, which is directed in insertion direction S and thus prevents two-part adapter 71, 72 and combination electrode 20 from being pulled out.

Sealing ring 23 is held in its operating position and slightly compressed.

An annular supporting element 22, which is located between supporting disc 11 and two-part adapter 71, 72, contacts sealing ring 23 with an annular compressing surface 16 and sealing ring 23 is pressed by the tensioning force pointing in insertion direction S on the periphery of combination electrode 20 in locating section 21 and at the same time on supporting disc 11. Measurement chamber 4 is thereby sealed, in that sealing ring 23 abuts tightly against supporting disc 11 and at the same time tightly against the periphery of locating section 21.

Two-part adapter 71, 72 extends from locating section 21 up to a fixing section 25 of combination electrode 20 and thus protects combination electrode 20 effectively against damage. A further sealing ring 23" is located in fixing section 25 between second adapter part 72 and combination electrode 20.

The assembly of combination electrode 20 with measuring cell 1 is conceivably easy and the system can be used universally by providing different two-part adapters 71, 72 and/or supporting discs 11 and/or supporting elements 22.

Figure 3:
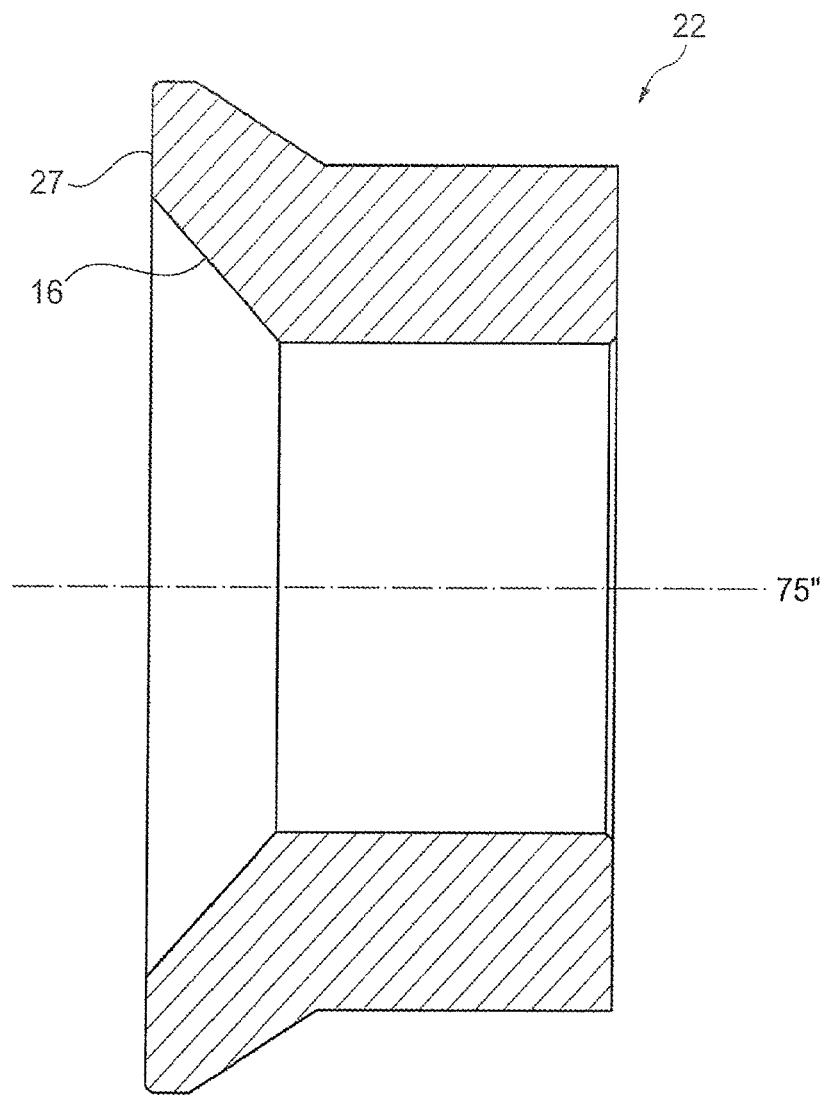
FIG. 3 shows diagrammatically a supporting element of the system according to the invention.

FIG. 3 shows diagrammatically supporting element 22 in an individual view. Supporting element 22 is constituted rotationally symmetrical to its longitudinal axis 75". Supporting element 22 comprises a continuous opening along longitudinal axis 75". Supporting element 22 comprises compressing surface 16 and a stop 27. In the assembled state, stop 27 abuts against supporting disc 11 and compressing surface 16 compresses sealing ring 23.

For the assembly of combination electrode 20 with measuring cell 1, a closure cap is first removed from second adapter part 72. Combination electrode 20 is introduced into two-part adapter 71, 72 and is screwed in fastening region 26 with the rear part of second adapter part 72 in fixing section 25. Sealing ring 23" is thus compressed and seals the region between second adapter part 72 and combination electrode 20 in fixing region 25. Second adapter part 72 is then screwed further into first adapter part 71. First adapter part 71 thus presses on compressing element 22 in insertion direction S. Compressing element 22 thus presses with compressing surface 16 on sealing ring 23 in insertion direction S. Sealing ring 23 is thus compressed and seals the region between combination electrode 20 and compressing element 22.

The previously described embodiment is solely to be regarded as an exemplary variant of the invention and does not limit the core idea of the invention in any way.

LIST OF REFERENCE NUMBERS

1 Measuring cell
2 Inlet opening
3 Outlet opening
4 Measurement chamber
5 Measuring cell body
6 Insertion opening
71 First adapter part
72 Second adapter part
73 Internal thread
74 External thread
75, 75' Longitudinal axis
75" Longitudinal axis
8 PH measurement locating fixture 11 Supporting ring
12 Shoulder
13 Snap-on noses
14 Stop
16 Compressing surface
20 Combination electrode
21 Locating section
22 Compressing element *
23 Sealing ring
23', Sealing ring
23"
24 Measurement tip
25 Fixing section
26 Fastening region
27 Stop
30, 30' Connection adapter
S Insertion direction

What is claimed is:

1. A pH measuring cell, comprising:
a measurement chamber and at least one opening for a fluid,
a pH measurement locating fixture configured to locate a rod-shaped locating section of a combination electrode for measuring a pH value of the fluid in the measurement chamber, the pH measurement locating fixture having an insertion opening through which the locating section is inserted in an insertion direction,
a compressing element configured to compress a sealing ring of the combination electrode, the sealing ring being arranged in the locating section, the sealing ring being configured to seal the measurement chamber against an environment, and
an adapter configured to locate the combination electrode in a fastening region of the combination electrode,
wherein the adapter is constituted in two parts with a first adapter part and a second adapter part,
wherein the second adapter part is configured to locate the combination electrode in the fastening region by a screw connection,
wherein the second adapter part is screwed into the first adapter part,
wherein pressure is exerted on the compressing element by the first adapter part by the screwing-in of the second adapter part,
wherein the sealing ring is compressed by the compressing element by the pressure of the first adapter part, and
wherein the measurement chamber is sealed with respect to the environment.

2. The measuring cell according to claim 1, wherein the compressing element is annular and has a bevelled compressing surface, and
wherein the compressing surface abuts against the sealing ring.

3. The measuring cell according to claim 1, wherein the sealing ring is arranged between a supporting ring and the compressing element.

4. The measuring cell according to claim 1, wherein the measurement chamber is defined by a measuring cell body on which the pH measurement locating fixture is formed.

5. A system comprising:
a pH measuring cell through which a fluid is configured to flow, the pH measuring cell comprising:
a measurement chamber, the measurement changer having at least one opening for the fluid,
a pH measurement locating fixture,
a compressing element, and
an adapter constituted in two parts with a first adapter part and a second adapter part, and
a combination electrode, comprising:
a rod-shaped locating section configured to measure a pH value of the fluid in the measurement chamber, the rod-shaped locating section being located by the pH measurement locating fixture and inserted into the insertion opening of the pH measurement locating fixture in an insertion direction, and
a sealing ring arranged in the rod-shaped locating section, the sealing ring being configured to seal the measurement chamber against an environment,
wherein the compressing element is configured to compress the sealing ring of the combination electrode,
wherein the adapter is configured to locate the combination electrode in a fastening region of the combination electrode,
wherein the second adapter part is configured to locate the combination electrode in the fastening region by a screw connection,
wherein the second adapter part is screwed into the first adapter part,
wherein pressure is exerted on the compressing element by the first adapter part by the screwing-in of the second adapter part,
wherein the sealing ring is compressed by the compressing element by the pressure of the first adapter part, and
wherein the measurement chamber is sealed with respect to the environment.

6. A pH measuring cell, comprising:
a measurement chamber and at least one opening for a fluid,
a pH measurement locating fixture configured to locate a rod-shaped locating section of a combination electrode for measuring a pH value of the fluid in the measurement chamber, the pH measurement locating fixture having an insertion opening through which the locating section is inserted in an insertion direction,
a compressing element configured to compress a sealing ring of the combination electrode, the sealing ring being arranged in the locating section, the sealing ring being configured to seal the measurement chamber against an environment, and
an adapter configured to locate the combination electrode in a fastening region of the combination electrode,
wherein the adapter is constituted in two parts with a first adapter part and a second adapter part,
wherein the compressing element is annular and has a bevelled compressing surface, and
wherein the compressing surface abuts against the sealing ring.

7. A pH measuring cell, comprising:
a measurement chamber and at least one opening for a fluid,
a pH measurement locating fixture configured to locate a rod-shaped locating section of a combination electrode for measuring a pH value of the fluid in the measurement chamber, the pH measurement locating fixture having an insertion opening through which the locating section is inserted in an insertion direction,
a compressing element configured to compress a sealing ring of the combination electrode, the sealing ring being arranged in the locating section, the sealing ring being configured to seal the measurement chamber against an environment, and
an adapter configured to locate the combination electrode in a fastening region of the combination electrode, wherein the adapter is constituted in two parts with a first adapter part and a second adapter part, and wherein the sealing ring is arranged between a supporting ring and the compressing element.

* * * * *